March 31, 1936.                J. A. GEORGE                    2,035,802
                            TIRE TRIMMING DEVICE
                         Filed March 21, 1935            2 Sheets-Sheet 1
FIG_1
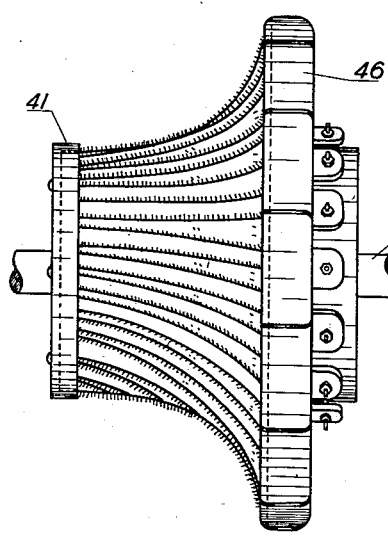
FIG_2
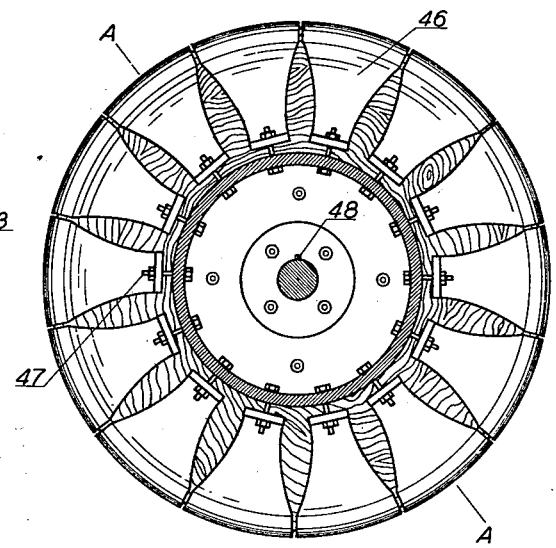
FIG_3
FIG_4
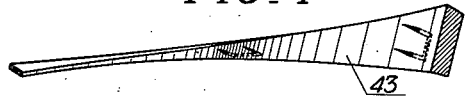
FIG_5
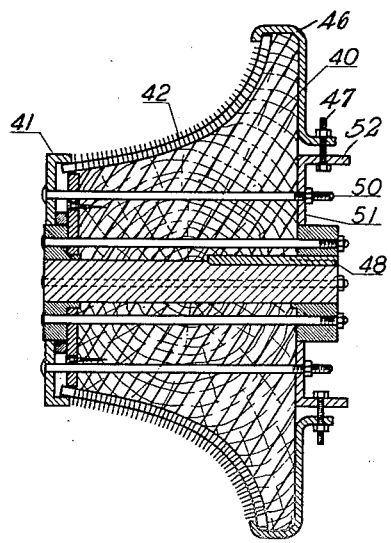
FIG_6
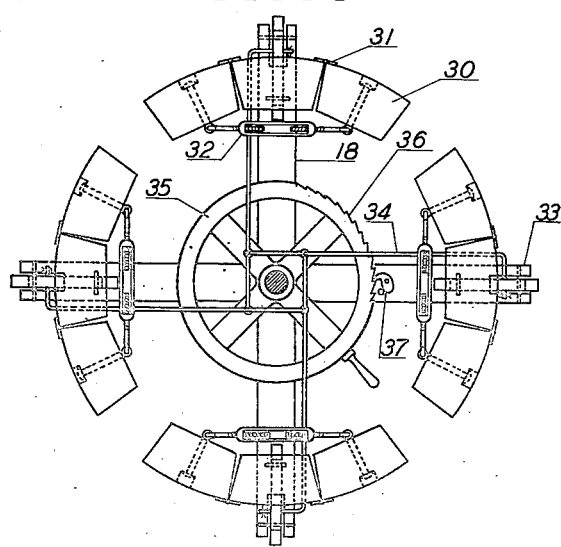
INVENTOR
James A. George
by William B. Jaspert
Attorney.

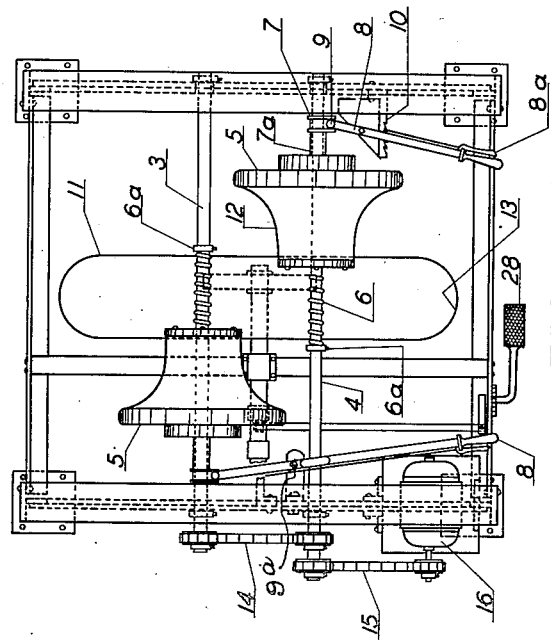

Patented Mar. 31, 1936

2,035,802

UNITED STATES PATENT OFFICE 2,035,802

TIRE TRIMMING DEVICE

James A. George, Brackenridge, Pa.

Application March 21, 1935, Serial No. 12,216

6 Claims. (Cl. 82—1)

This invention relates to new and useful improvements in automobile tire dressing machines, and it is among the objects thereof to provide a simple, durable and efficient means for removing treads from old tires for the purpose of re-treading such tires by a vulcanizing operation.

It is a further object of the invention to provide a plurality of cutters shaped to simultaneously engage the curved periphery of the tire and to be adjustable relative to such tire to increase or lessen the cutting action on any portion of the rounded surface.

Another object of the invention is the provision of means for mounting the tire to be worked on in proper relation to the range of movement of the cutting or shredding members and to be adjustable vertically relative thereto.

Still another object of the invention is the provision of shredding or cutting devices of composite construction made up of a series of suitably spaced shredding teeth or the like which shall be inexpensive to manufacture and which shall be constructed of interchangeable parts that are readily accessible for replacement or repairs.

Still a further object of the invention is the provision of an organization of the hereinabove described elements which shall greatly facilitate the shredding or cutting of tire treads for the purpose of removing the treads therefrom which has heretofore been a slow, tedious and costly operation.

These and other objects of the invention will become more apparent from a consideration of the accompanying drawings constituting a part hereof in which like reference characters designate like parts and in which:

Fig. 1 is a plan view of a shredding or cutting element embodying the principles of this invention;

Fig. 2 is a side elevational view thereof;

Figs. 3 and 4 views in perspective of a strip and wedge employed for mounting the shredding teeth in the structure of Fig. 1;

Fig. 5 a cross-sectional view of the cutter of Figs. 1 and 2;

Fig. 6 a side elevational view of a chuck or holder for mounting the shoe or tire;

Fig. 7 a plan view of an assembled machine unit having the cutting members and tires in cooperative working arrangement to coact for the removal of the treads from the tire members;

Fig. 8 a front elevational view of the apparatus shown in Fig. 7; and

Fig. 9 a cross-section taken though the tire and supporting chuck.

With reference to Figs. 7 and 8 of the drawings the structure therein illustrated comprises a plurality of vertical standards 1 which are joined by cross members 2 to constitute a rugged frame for journalling a pair of shafts 3 and 4 on which are mounted cutters or shredders 5 that are axially movable on the shafts 3 and 4 by spline connections therewith. Cutters 5, which are shown in greater detail in Figs. 1 to 5 inclusive, abut against coil springs 6 which in turn abut against collars 6a adjustably mounted on shafts 3 and 4. Cutters 5 are axially movable by levers 8 pivoted at 9 to collars 7 that abut against sleeves 7a extending from the cutters 5 and levers 8 are further pivoted at 9a on lugs extending from the cross frames. Levers 8 are provided with ratchet pawls 8a that engage ratchets 10 extending on the frames 2. By manipulating the levers 8, the cutters 5 can be independently adjusted relative to a tire designated by the numeral 11, which is mounted therebeneath, so as to bring the cutting faces 12 of the cutters in contact with the curved periphery 13 of the tire to shred or cut away the rubber tread and roughen the surface of the tire for receiving a new layer of rubber which is vulcanized thereon in a well-known manner. Shafts 3 and 4 are connected by a sprocket chain 14 and a chain 15 operatively connects shaft 4 with a drive motor 16 that is mounted on a bracket 17 attached to the standard 1. When the motor is energized, shafts 3 and 4 will be actuated to revolve cutters 5.

The tire 11 is mounted on a support which is shown in greater detail in Fig. 6 of the drawings and generally designated by the numeral 18, this support being mounted to rotate with a shaft 19 journalled on a bracket 20 that is slidably vertical on a drive shaft 21 which is driven by a motor 22 through the bevel gears 23. A bevel gear 24 is splined on shaft 21 to render it movable axially and rotatably with the shaft 21, gear 24 interacting with the teeth of a bevel gear 25 that operatively connects shaft 19 to rotate the same. Shaft 19 is also supported on a telescopic journal 26, the entire shaft being movable vertically by a rod 27 operated by a ratchet foot pedal lever 28, this adjustment being provided to move the tire 11 bodily in a vertical direction relative to cutters 5.

The tire mount, as shown in Figs. 6 and 9, consists of blocks 30 hinged at 31 and adjustable by a turn-buckle 32 to change the radius of the block assembly. The hinged blocks as units are mounted on radial arms 33 on which they are adjustable by rods 34, the ends of which constitute cranks that are mounted in a ratchet wheel 35 having stop positions 36 engageable by a latch 37. By rotating the wheel 35, the hinged units 30 are expanded or contracted as desired and latch 37 locks these units in their adjusted position. The tire 11 fits on the grooved periphery 38 of the blocks 30 as shown in Fig. 9.

With reference to Figs. 1 to 5 inclusive of the drawings, the cutter or shredder consists of a body of wood or other light weight material 40 generally shaped to the curvature shown in Figs. 1 and 5 which may be designated a hub, the hub being provided with a hollow flange 41 at one end for receiving the ends of parallel helically skewed strips 42 and helically formed wedges 43. Strips 42 are of a width to intimately engage staples 44 which fit in notches 45 of the strips, and when mounted in the manner shown in Fig. 1 constitute rows of sharp pointed teeth. The other end of strips 42 and wedges 43 are secured by clamps 46 that are fastened to the hub by screw bolts 47, Fig. 2. The hub in Fig. 2 illustrates slots or key-ways 48 that slide on keys or splines provided on shafts 3 and 4.

The hub construction is more clearly shown in Fig. 5 in which flange 41 engages the ends of strips 42, the core of the structure being illustrated as a wooden element having through bolts 50 extending through to clamp the end flange 41 and a hub plate 51 to the core member. The plate 51 is provided with a flange 52 in cooperative alignment with clamps 46.

The operation of the above described apparatus is briefly as follows: A used tire is mounted on the adjustable support 18 and its vertical position is adjusted to the position wherein the curvature 13 of the tread will be in alignment with the corresponding curvature of the cutter element, this being a matter of judgment to some degree but readily accomplished with a little experience. Motors 16 and 17 are then energized causing cutters 5 and tire 11 to rotate at suitable speeds, the cutter speed being preferably greater than the peripheral speed of the tire. Levers 8 are then manipulated to move the cutters axially and in a direction transversely of the tire to bring the cutting teeth in contact with the rubber surface thereby cutting or shredding the rubber to remove it or only part of it from the tire fabric. If it is not desired to remove the tread completely this operation will so roughen the surface of the tire that it will be especially adapted to adhere to the new tread when it is vulcanized thereon forming substantially a homogeneous and integral tread section. By the individual adjustment of the cutter elements 5 through manipulation of levers 8, any amount of cutting can be accomplished on either side of the tire tread in accordance with the condition of wear and the quantity of rubber it is desired to remove, or it may be desirable to mount the cutter heads on swivel mountings to obtain further adjustment of the cutting angle.

It is apparent that the apparatus hereinbefore described provides a simple and efficient means for removing the treads from old tires, and that the cutting apparatus can be inexpensively and effectively constructed by the use of wire staples although obviously other cutting teeth may be employed as, for example, a series of circular saw disks or cutters may be especially milled or devised to the curvature approximating that of the tires which may be operated and manipulated in the manner herein disclosed.

Although one embodiment of the invention has been herein illustrated and described, it will be obvious to those skilled in the art that various modifications may be made in the details of construction without departing from the principles herein set forth.

I claim:

1. Apparatus for trimming rubber tire treads comprising a rotatable support for mounting the tire to be trimmed, means for rotating said support, a pair of cutter heads provided with cutting teeth, the cooperating cutting edges of which are arranged to form a concave cutting face, means for subjecting the cutter head and tire support to relative movement in a manner to effect cutting engagement of the cutter head with the tire tread, and means for subjecting the cutter head to rotary movement independently of the rotary movement of the tire support.

2. Apparatus for trimming rubber tire treads comprising a rotatable support for mounting the tire to be trimmed, a plurality of cutter heads having cutting faces of substantially concave shape, means for mounting the heads adjacent the outer periphery of the tire to be trimmed, means for moving the cutter heads from opposite sides into cutting engagement with the periphery of the tire to be trimmed, and means for subjecting the cutter heads to rotary movement independently of the movement of the tire support whereby the tread of the tire is subjected to the cutting action of the cutter heads.

3. Apparatus for trimming rubber tire treads comprising a rotatable support for mounting the tire to be trimmed, a cutter head mounted to be movable relative to the tire support to effect cutting engagement of a tire mounted on said support, said head comprising a core member having a curved outer periphery with alternately disposed strips and wedges secured on said curved periphery, cutting teeth secured by said strips and wedges, and means for subjecting the cutter head to rotary movement independently of the tire support.

4. Apparatus for trimming rubber tire treads comprising a rotatable support for mounting the tire to be trimmed, and a cutter head mounted for relative movement with the surface of the tire to be trimmed, said cutter head comprising a core structure having a curved outer periphery terminating in a flanged end at the small diameter thereof for receiving the ends of strips and wedges, the strips being provided with slots for receiving U-shaped staples, said core structure having clamping means attached to its large periphery for engaging one end of the strips and wedges.

5. Apparatus for trimming rubber tire treads comprising a rotatable support having expansible and contractible members for engaging the inner periphery of a tire to be trimmed, means for adjusting the curvature of said tire engaging members, means for simultaneously expanding and contracting the members and for locking them in their adjusted position, a cutter head mounted in cooperative alignment with said tire support and being rotatable independently thereof, and means for adjusting the relative position of said head and support whereby to bring the face of the cutting head in cooperative engagement with the tread of the tire to be trimmed.

6. Apparatus for trimming rubber tire treads comprising a rotatable support for mounting the tire to be trimmed, a cutter head of substantially concave contour having teeth for shredding the treads of the tire, the teeth following the contour of the cutting face of the head, means for subjecting the head to rotary movement independently of the movement of the tire support, means for varying the radial distance between the tire support and cutter head and means independent of said last named means for moving said cutter head into cutting engagement with the tread of a tire mounted on the tire support.

JAMES A. GEORGE.